United States Patent [19]
Duron

[11] Patent Number: 5,934,458
[45] Date of Patent: Aug. 10, 1999

[54] MOISTURE PRESERVATION, BAKED GOODS CONTAINER

[76] Inventor: Cherilyn M. Duron, 7444 Crestline, Crestline, Ohio 44827

[21] Appl. No.: 09/009,039

[22] Filed: Jan. 20, 1998

[51] Int. Cl.$^6$ ...................................................... A24F 25/02
[52] U.S. Cl. .......................... 206/204; 206/205; 312/31.1
[58] Field of Search ..................................... 206/205, 204; 426/124, 128, 131, 418, 419; D7/613; 312/31, 31.01, 31.1

[56] References Cited

U.S. PATENT DOCUMENTS

| | | |
|---|---|---|
| 560,811 | 5/1896 | Meng . |
| 1,481,971 | 1/1924 | Whiting .................................. 206/205 |
| 1,504,062 | 8/1924 | Ladd . |
| 1,598,557 | 8/1926 | Clark . |
| 1,621,283 | 3/1927 | Shover .................................. 206/205 |
| 2,219,959 | 10/1940 | Laidley . |
| 2,365,185 | 12/1944 | Gailey ..................................... 299/24 |
| 2,497,399 | 2/1950 | Dexter ..................................... 99/154 |
| 2,561,905 | 7/1951 | Lombard . |
| 2,676,078 | 4/1954 | Young . |
| 2,915,404 | 12/1959 | Tessmer et al. ......................... 99/171 |
| 3,081,137 | 3/1963 | Kolokythas ........................... 312/31.1 |
| 3,227,374 | 1/1966 | Valentine . |
| 3,580,409 | 5/1971 | Soboleski .................................. 215/81 |
| 3,627,393 | 12/1971 | Hickson et al. ....................... 312/31.1 |
| 4,008,930 | 2/1977 | Swainson . |
| 4,010,736 | 3/1977 | Sacomani et al. . |
| 4,394,144 | 7/1983 | Aoki ..................................... 206/204 |
| 4,500,145 | 2/1985 | Fassauer . |

FOREIGN PATENT DOCUMENTS

| | | | |
|---|---|---|---|
| 4-128161 | 4/1992 | Japan ..................................... 206/204 |
| 5-294368 | 11/1993 | Japan ..................................... 206/204 |

*Primary Examiner*—Paul T. Sewell
*Assistant Examiner*—John Preta
*Attorney, Agent, or Firm*—John D. Gugliotta

[57] ABSTRACT

A moisture preservation, baked goods container is disclosed, consisting of a lower housing and base, which form the bottom portion of the device. An upper housing, of generally dome shaped configuration, forms the top portion of the device and is transparent so as to facilitate vision into the device. Large amounts of baked goods, such as entire batches of cookies, may be stacked in the bottom housing and above into the dome shaped upper housing, which closes over the baked goods. Built into the upper surface of the upper housing and extending downward is a humidifying element chamber, which is of generally rectangular shape, extends outward horizontally, and is large enough to hold a piece of bread. A securement door holds the bread in the humidifying element chamber, and is attached to the upper housing by a securement door retaining means, such as a spring hinge. Positioned in the securement door are a plurality of evaporation holes which transfer the moist air to the baked goods, and evaporation protrusions, on which the bread rests, thus facilitating the free flow of moisture laden air between the humidifying element chamber and the upper storage compartment and lower storage compartment. A grasping means is used to open and close the upper housing.

17 Claims, 4 Drawing Sheets

MOISTURE PRESERVATION, BAKED GOODS CONTAINER

BACKGROUND OF THE INVENTION

1. Field of the Invention

The present invention relates generally to baked goods containers and, more particularly, to a moisture preservation, baked goods container.

2. Description of the Related Art

Nearly everyone has fond memories of sitting down to eat home baked goods, like cookies and cakes. Today, however, in this busy world, it seems there is little time to bake home made cookies, cakes or bread. Thus, when time is found to create these special delicacies, it becomes especially important that the baker be able to preserve these desserts for extended periods of time, so that the baked goods can be eaten and enjoyed at a leisurely pace.

Whether the baked goods are made "from scratch" or purchased right from the baker's oven, preserving the items becomes a problem once they are brought home. Leaving the cookies or other delicacies out on a counter top inevitably results in quick dehydration of the baked goods, which is caused by the normally dry, low humidity conditions that exist in most homes and other buildings. The moisture in the baked goods is drawn out, over time, into the surrounding, dryer atmosphere, until a point of equilibrium is reached between the high humidity content of the baked goods and the lower humidity in the surrounding atmosphere. This moisture exchange results in dry, hard, uninviting baked goods.

Placing the items in the refrigerator or freezer does little to solve this problem, as low humidity can be a problem in either of these devices. Moreover, frozen baked goods lose some of their freshness when placed in a freezer.

Wrapping the cookies in plastic wrap or aluminum foil creates several problems. First, if the seal on the plastic wrap or aluminum foil is not air tight, moisture from the baked goods will evaporate out into the room, which renders these materials useless for moisture preservation. Also, these materials are costly and cumbersome to use, and over time, constitute a significant expenditure for the baker.

Thus, attempts have been made to provide a moisture preserving container for the baked goods to be stored in prior to being consumed. Each device attempts to take advantage of the physical laws of nature that state that the moisture content of materials is higher when the material has been in contact for a period of time with air of high humidity, and that the humidity of the air in contact with the solid material affects the amount of water absorbed by the solid material. Thus, by placing the materials in a high humidity environment, one can increase the amount of water retained by the material, or put another way, the equilibrium moisture content of the material can be raised to a sufficient volume so as to effectuate the preservation of the material, in this case, baked goods, in a soft, moist state sufficient for eating hours or days after initial baking.

It is this equilibrium moisture content that the prior art devices attempt to control. Some devices attempt to do this by placing water in with the baked goods. An example of this type of device is U.S. Pat. No. 2,219,959, issued in the name of Laidley. The '959 device utilizes a pulp type material to hold water that will help maintain humidity in the container.

Other devices utilize water encapsulating technology, in which aqueous liquids are encapsulated in capsules 10 to 4,000 microns in diameter that have a slow, apparently constant water vapor release rate. An example of this technology is disclosed in U.S. Pat. No. 3,801,011, issued in the name of Guehler et. al.

The problem with such technology is that it is expensive to produce and use. In addition, such complex moisture maintenance means are always subject to mechanical failure. Also, the capsules are fragile and subject to breakage. In summary, this is an expensive and unnecessarily technical and complicated solution to a simple problem.

Humidity maintenance technology is commonly used in humidors and other devices designed to maintain the humidity in cigars and cigarettes. Many times, a mechanical or chemical means is introduced within the package which serves a source of humidity. Such humidifying elements include an invert sugar solution, a glauber's salt solution, a semipermeable envelope containing sodium bicarbonate, a mixture of Glauber's salt and borax or the like. Examples of humidors include U.S. Pat. No. 5,556,579, issued in the name of Newman, U.S. Pat. No. 4,008,930, issued in the name of Swainson, U.S. Pat. No. 2,680,048, issued in the name of McDonald, and U.S. Design Pat. No. D293,608, issued in the name of Fitzgerald et. al.

In general, humidors such as the ones mentioned above suffer from one or more of the following problems. Such devices utilize water and a porous substance to hold the water, which creates several problems. Refilling the container is a hazard, as spilled water can ruin the contents of the container. Such devices are not configured to be used with baked goods, especially large amounts of baked goods. The porous material used to hold the water is prone to bacterial contamination over time, and as such, requires frequent replacement, at significant inconvenience and delay. Such devices are expensive to manufacture. Such devices utilize mechanical parts which can malfunction. Such devices do not sufficiently control the rate of moisture transfer from the water storage section to the items stored in the container, resulting in too much humidity or a lack thereof.

A very significant problem with such devices is that the technology used to provide humidity does not work successfully when applied to baked goods. The moisture needed to maintain tobacco is significantly different from that needed to maintain the softness of baked goods. As such, baked goods cannot be placed in with large amounts of water, in that the amount of water that the baked goods with absorb to reach their equilibrium moisture content is such that the baked goods will become soggy and uninviting to eat. Thus, a means must be found to provide only enough moisture to prevent drying out without creating a soggy baked good.

Some devices are used in conjunction with microwave ovens, such as those disclosed in U.S. Pat. No. 5,432,324, issued in the name of Freewald and U.S. Pat. No. 5,313,878, issued in the name of Strait. These devices utilize mechanical misting devices or sponge type elements which provide moisture.

Some devices keep the baked goods from spoiling, but do nothing to assist with the maintenance of sufficient moisture content of the items. These devices usually do this by reducing the storage temperature of the goods. For example, the device disclosed in U.S. Pat. No. 3,627,393, issued in the name of Hickson et. al., utilizes solid carbon dioxide to reduce the storage temperature. The problem with such devices is that they do not maintain humidity in the storage compartment, and actually may further aggravate the problem by introducing a low humidity creating substance to the device.

A search of the prior art did not disclose any patents that read directly on the claims of the instant invention. Consequently, a need has been felt for providing a simple apparatus and method which will maintain the moisture content of baked goods.

SUMMARY OF THE INVENTION

It is therefore an object of the present invention to provide an improved moisture preservation baked goods container that is simple to operate, provides sufficient moisture to preserve baked goods, is air tight so as to prevent moisture escape, is long lasting, reusable, durable, easy to clean and dishwasher safe.

Briefly described according to one embodiment, the present invention comprises a lower housing, base, lower lip, lower storage compartment, upper housing, upper storage compartment, upper lip, humidifying element chamber, securement door, securement door retaining means, evaporation holes, evaporation protrusions, housing attachment means, and grasping means.

The lower housing and base form the bottom portion of the device. An upper housing, of generally dome shaped configuration, forms the top portion of the device and is transparent so as to facilitate vision into the device. Large amounts of baked goods, such as entire batches of cookies, may be stacked in the bottom housing and above its rim into the dome shaped upper housing, which closes over the baked goods.

Built into the upper surface of the upper housing and extending downward is a humidifying element chamber, which is of generally rectangular shape, extends outward horizontally, and is large enough to hold a piece of bread.

A securement door holds the bread in the humidifying element chamber, and is attached to the upper housing by a securement door retaining means, such as a spring hinge. Positioned in the securement door are a plurality of evaporation holes which transfer the moist air to the baked goods, and evaporation protrusions, on which the bread rests, thus facilitating the free flow of moisture laden air between the humidifying element chamber and the upper storage compartment and lower storage compartment. A grasping means is used to open and close the upper housing.

It is an object of the present invention to provide a device that preserves the moisture in baked goods during storage, prior to consumption, and does this without utilizing artificial, porous type materials which hold water, thereby reducing the chances of contamination of the various sponge type devices.

It is an object of the present invention to provide a device that provides such moisture by means of a replaceable piece of bread. Utilizing bread creates several advantages. First, the bread can be replaced periodically, thus reducing the risk of contamination as discussed above. Second, the bread takes up a very small amount of space, thereby leaving more room for items to be stored and preserved. Third, the bread provides sufficient moisture for the baked goods without creating a soggy item. Fourth, bread is a readily available item. Fifth, bread is a relatively safe item to use.

It is an object of the present invention to provide a device that is specifically designed to hold a piece of bread.

It is another object of the present invention to provide a dome top structure that has sufficient volume to store an entire batch of cookies or similar baked goods by stacking them on top of each other.

It is an object of the present invention to provide a device that is specifically designed for holding large amounts of baked goods.

It is another object of the present invention to provide a simple means for providing sufficient humidity in the device so as to maintain sufficient moisture of the baked goods in the present invention. This is accomplished by placing a slice of bread into the bread compartment, and the baked goods drawing the moisture from it, thereby, maintaining the freshness of the baked goods.

It is another object of the present invention to provide a device in which the moisture producing means is separated from the baked goods, such that the baked goods do not become soggy.

It is another object of the present invention to provide an upper housing that is transparent, so that the operator can see how many items are left in the device without opening the device and disrupting the humidity therein.

It is another object of the present invention to provide an air tight seal of the present invention, thereby keeping the moisture from escaping the present invention.

It is another object of the present invention to provide a long lasting, reusable, durable device that is dishwasher safe.

It is another object of the present invention to provide a device that is made from a shatterproof material, such as plastic.

It is another object of the present invention to provide a device that is easy to clean.

It is another object of the present invention to provide a device that can be manufactured by existing technologies used in the manufacture of conventional cookie containers, thereby reducing production costs.

It is another object of the present invention to provide a humidity maintenance device that is simple in design, without numerous moving mechanical parts.

Descriptive Key

10 moisture preservation, baked goods container
20 lower housing
30 base
40 lower lip
50 lower storage compartment
60 baked goods
70 upper housing
80 upper storage compartment
90 upper lip
100 humidifying element chamber
110 humidifying element
120 securement door
130 securement door retaining means
140 evaporation hole
150 evaporation protrusion
160 housing attachment means
170 grasping means
180 humidifying element chamber securement means

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

In order to describe the complete relationship of the invention, it is essential that some description be given to the manner and practice of functional utility and description of a moisture preservation, baked goods container 10.

The best mode for carrying out the invention is presented in terms of its preferred embodiment, herein depicted within the FIGS. 1 through 6.

1. Detailed Description of the Figures

Figure 1:
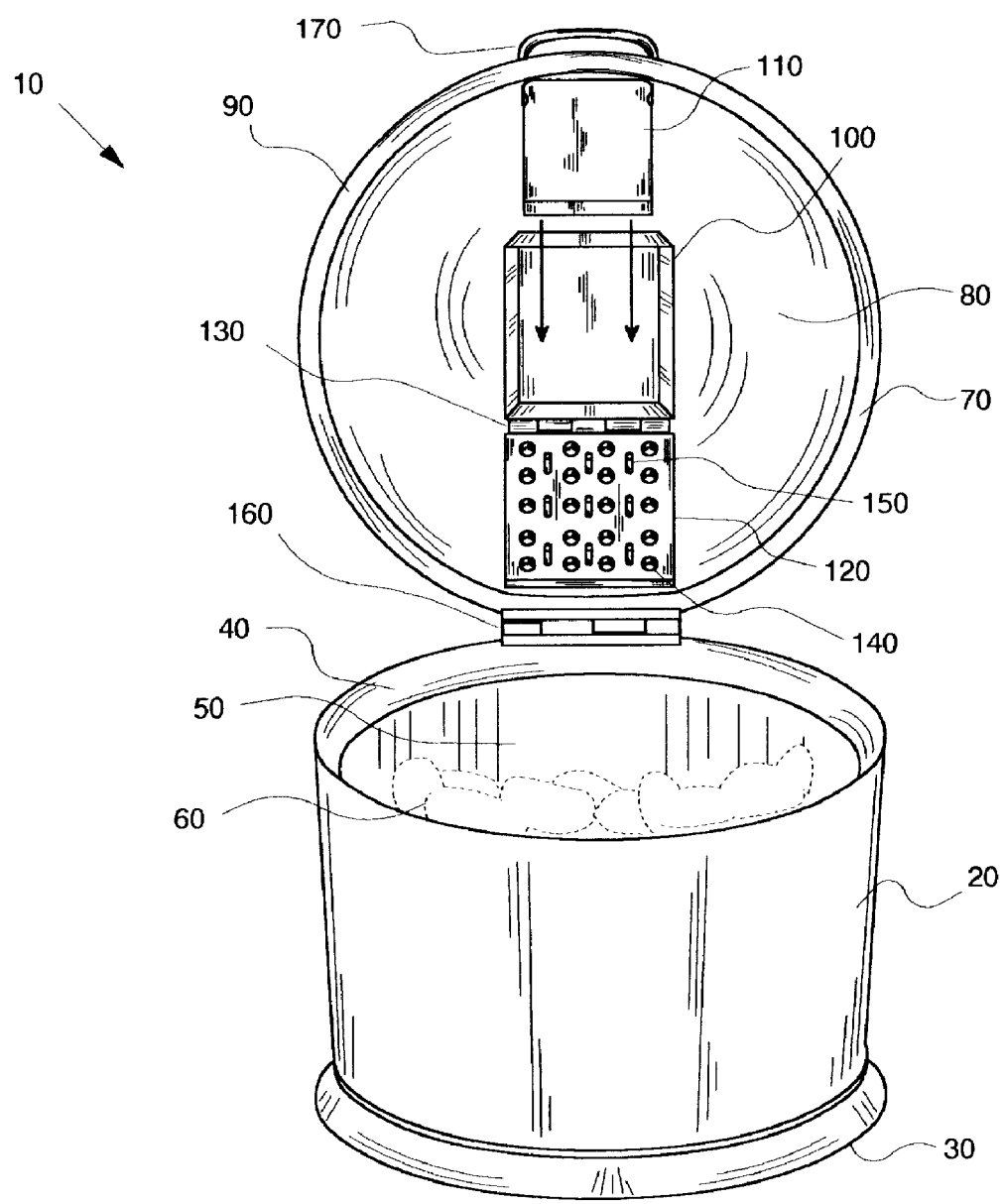
FIG. 1 is a front perspective view of a preferred embodiment of a moisture preservation, baked goods container 10.

Referring now to FIG. 1, a preferred embodiment of a moisture preservation baked goods container 10 is shown, according to the present invention, is comprised of a lower housing 20. The lower housing 20 is of generally cylindrical configuration with increasing vertical cross sectional diameter, such that as the lower housing 20 rises in vertical height, a V-type configuration results. The lower housing 20 is composed of a strong, lightweight material such as plastic.

Figure 2:
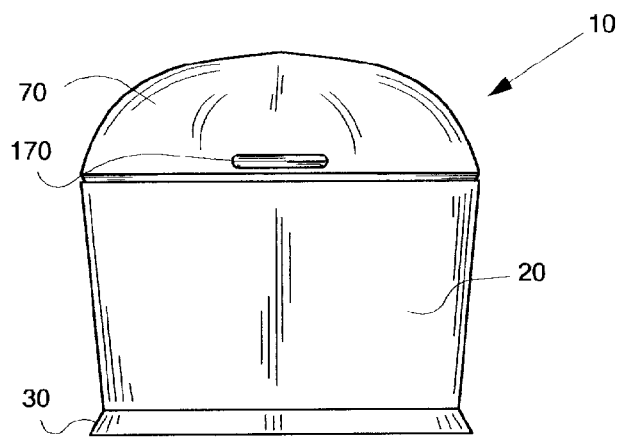
FIG. 2 is a front view thereof.
Figure 3:
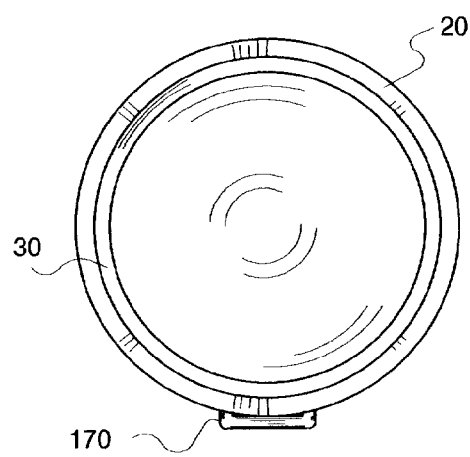
FIG. 3 is a bottom plan view.

Referring now to FIGS. 1, 2 & 3, attached to the lower end of the lower housing 20 is a base 30, of generally circular configuration, and forming the bottom surface of the preferred embodiment of the present invention. The lower housing 20 terminates at its upper end, opposite the base 30, in a lower lip 40. The lower lip 40 slopes downward and inward toward the radial center of the lower housing 20. The lower storage compartment 50 is the interior space formed by the lower housing 20 and base 30 and is of sufficient volume as to be capable of holding numerous baked goods 60, such as cookies, cakes, pie or bread.

Figure 4:
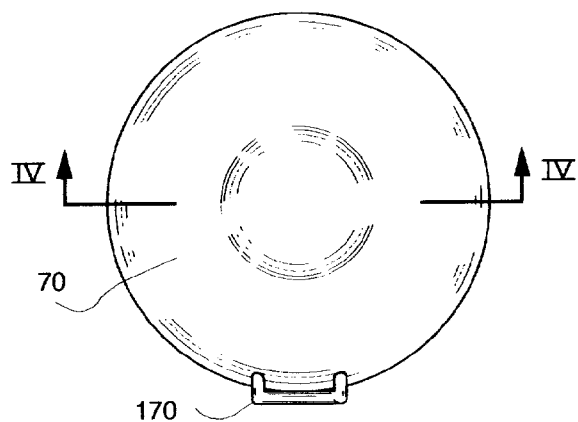
FIG. 4 is a top plan view.

Referring now to FIGS. 1 & 4, an upper housing 70 is of a general dome type configuration, with a radial center in linear alignment with the radial center of the lower housing 20. The upper housing 70 is composed of a transparent, strong, lightweight material, such as plastic. The upper storage compartment 80 is the interior space formed by the upper housing 70. The lower end of the upper housing 70 terminates in an upper lip 90. The upper lip 90 slopes inward and downward, toward the radial center of the upper housing 70.

Figure 5:
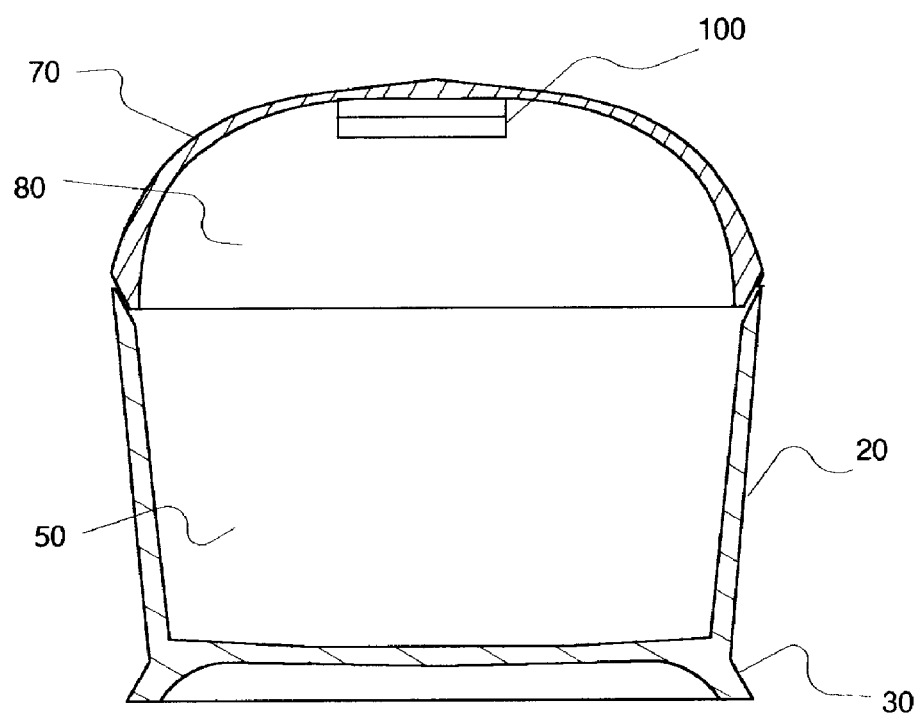
FIG. 5 is a front cross sectional view thereof in the closed position cut along lines IV—IV.

Referring now to FIGS. 1 & 5, built into the upper surface of the upper housing 70 and extending downward is a humidifying element chamber 100. The upper housing 70 is of sufficient thickness to house the humidifying element chamber 100. The humidifying element chamber 100 is of generally rectangular shape, and extends outward, so as to form a plane that is perpendicular to the radial centerline of the upper housing 70. The humidifying element chamber 100 is of sufficient volume so as to be able to contain within it a humidifying element 110, such as a piece of bread.

Attached to the lower posterior surface of the humidifying element chamber 100 is a securement door 120. The securement door 120 is of generally rectangular configuration, and has a cross sectional area slightly less than the humidifying element chamber 100, such that when the securement door 120 is closed, an air resistant seal is formed between the securement door 120 and the upper housing 70. As such, the humidifying element chamber 100 is enclosed on the top and sides by the upper housing 70 and enclosed on the bottom by the securement door 120.

The securement door 120 is attached to the upper housing 70 by a securement door retaining means 130, such as a spring hinge. Positioned in the securement door 120 are a plurality of evaporation holes 140. Each evaporation hole 140 passes completely through the securement door 120, and has a radial center that is perpendicular to the plane formed by the interior surface of the securement door 120. Each evaporation hole 140 is of sufficient size to facilitate the transfer of moisture from the humidifying element chamber 100 to the upper storage compartment 80 and the lower storage compartment 50.

Attached to the interior surface of the securement door 120 are a plurality of evaporation protrusions 150. Each evaporation protrusion 150 extends outward from the interior surface of the securement door 120, perpendicular to the securement door 120, and are of sufficient length to ensure that the humidifying element 110, such as bread, does not come in contact with the interior surface of the securement door 120. This facilitates the free flow of moisture laden air between the humidifying element chamber 100 and the upper storage compartment 80 and lower storage compartment 50.

The lower housing 20 and upper housing 70 are secured together by a housing attachment means 160, such as a hinge type member. The housing attachment means 160 facilitates the opening and closing of the mobile upper housing 70 relative to the stationary lower housing 20. In alternate embodiments, the lower housing 20 and upper housing 70 consist of any closed container configuration with an interior volume.

Figure 6:
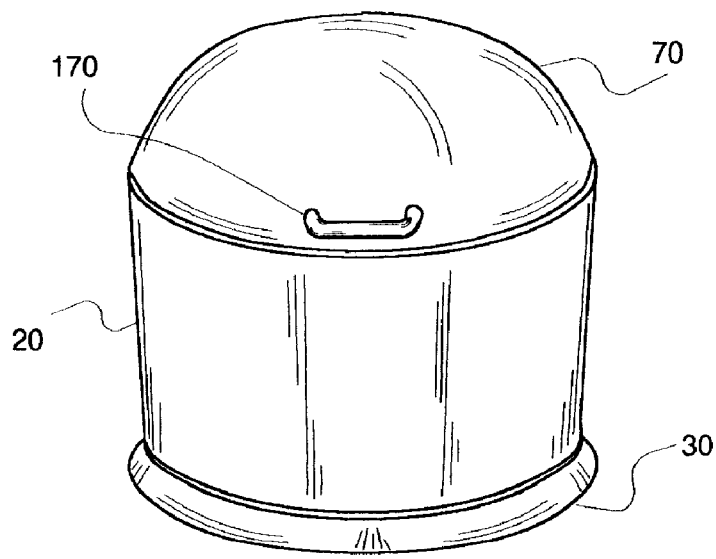
FIG. 6 is a front perspective thereof in the closed position.

Referring now to FIG. 6, with the present invention in the closed position, the lower lip 40 and upper lip 90 rest in continuous contact with each other, so as to form an air resistant seal. Attached to the anterior, exterior surface of the upper housing 70 is a grasping means 170. The grasping means 170 is used to open and close the upper housing 70.

Figure 7:
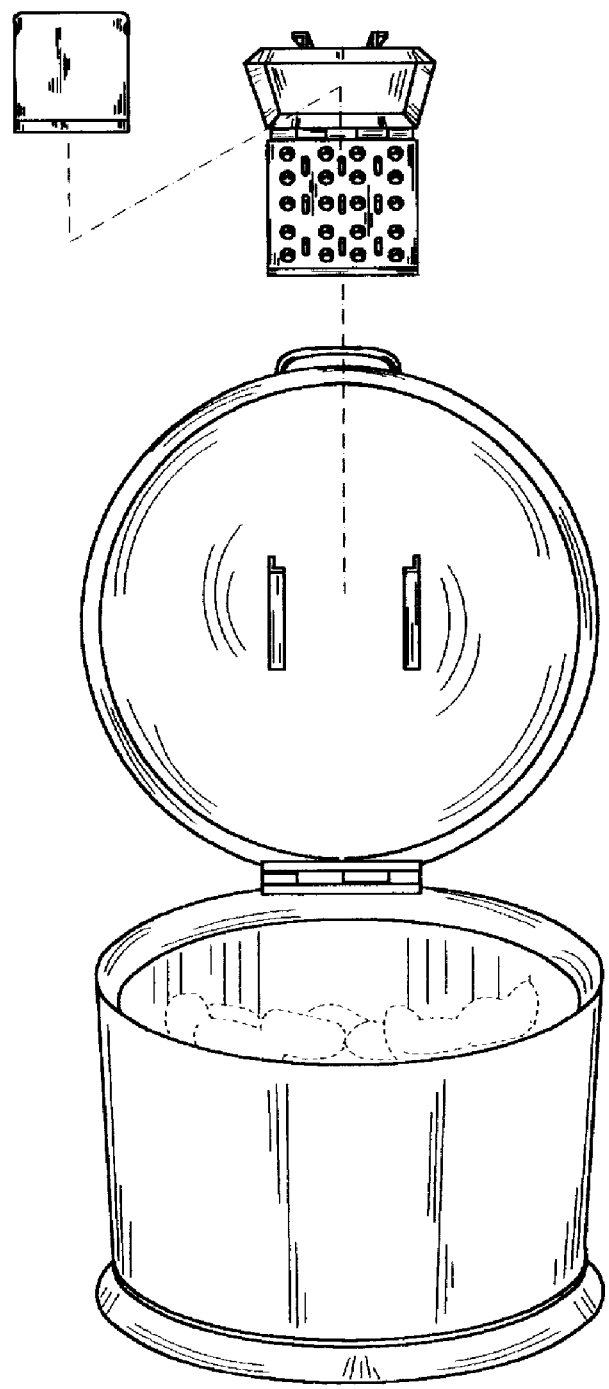
FIG. 7 is a front perspective exploded view of an alternate embodiment of the present invention.

Referring now to FIG. 7, in an alternate embodiment of the present invention, the humidifying element chamber 100 is a self-contained unit, and is detachable from the upper housing 70. A humidifying element chamber securement means 180 is attached to the upper exterior surface of the humidifying element chamber 100 and the upper interior surface of the upper housing 70. The humidifying element chamber securement means 180 connects the humidifying element chamber 100 to the upper interior surface of the upper housing 70. In alternate embodiments, various configurations can be used as the humidifying element chamber securement means 180.

2. Operation of the Preferred Embodiment

To use the present invention, the operator opens the upper housing 70 by grabbing the grasping means 170 and lifting. The securement door 120 is opened and a humidifying element 110, such as bread, is placed on the evaporation protrusions 150. If a significant amount of time will pass before the device is checked again, the humidifying element 110 can be moistened further with a small amount of water.

The securement door 120 is then closed. The lower storage compartment 50 is then filled with baked goods 60. If necessary, the baked goods 60 can be stacked above the lower housing 20, as long as the upper housing 70 can still close and the upper lip 90 and lower lip 40 can rest in contact with one another.

The upper housing 70 is then closed, and the moisture in the humidifying element 110 of bread will maintain sufficient humidity in the device so as to keep the baked goods 60 moist. Periodically, the procedure is repeated, this time, with the operator replacing the used, dry humidifying element 110 with a fresh humidifying element 110.

The foregoing description is included to illustrate the operation of the preferred embodiment and is not meant to limit the scope of the invention. The scope of the invention is to be limited only by the following claims.

What is claimed is:

1. A moisture preservation baked goods container comprising:
   a container, said container having a closed lower end and an open upper end forming a hollow interior cavity;
   a base, said base being attached to said lower end of said container, and forming the bottom of said moisture preservation baked goods container;
   a lower lip; said lower lip being located at said upper end of said container, and slanting inward;
   an lid, said lid having a lower surface and upper interior surface, an anterior exterior surface, a top, and a radial center, and said lid being of a configuration having an internal volume of at least 32 fluid ounces;
   an upper lip, said upper lip being located at said lower surface of said lid, and slanting inward;
   a humidifying element chamber, said humidifying element chamber being located inside said lid, said humidifying element chamber housing a humidifying element comprising a slice of bread, said humidifying element moistening the contents of said container;
   a housing attachment means, said housing attachment means used to connect said lid and said container;
   a grasping means, said grasping means being of a handle type configuration able to be utilized to open said lid, said grasping means being connected to said anterior exterior surface of said lid.

2. The moisture preservation baked goods container described in claim 1, wherein said upper lip and said lower lip are of any configuration such that the two surfaces join to form a continuous, air resistant seal.

3. The moisture preservation baked goods container described in claim 1, wherein the thickness of said lid at said top of said lid is sufficient to house said humidifying element chamber.

4. The moisture preservation baked goods container described in claim 1, wherein said humidifying element chamber is located inside of said lid.

5. The moisture preservation baked goods container described in claim 1, wherein said humidifying element chamber is of sufficient size so as to be able to hold said humidifying element therein.

6. The moisture preservation baked goods container described in claim 1, wherein said humidifying element chamber is built into and incorporated into said upper interior surface of said lid.

7. The moisture preservation baked goods container described in claim 1, wherein said humidifying element chamber is generally rectangular in shape, and extending outward, so as to form a plane that is perpendicular to the radial centerline of said lid.

8. The moisture preservation baked goods container described in claim 1, wherein said humidifying element chamber is removably attached to said lid.

9. The moisture preservation baked goods container described in claim 8, wherein said humidifying element chamber has an upper exterior surface and said humidifying element chamber further comprises:
   a humidifying element chamber securement means, said humidifying element chamber securement means being attached to said upper exterior surface of said humidifying element chamber, and attaching said humidifying element chamber to said interior upper surface of said lid.

10. The moisture preservation baked goods container described in claim 8, said humidifying element chamber being capable of removal from said moisture preservation baked goods container by disconnecting said humidifying element chamber securement means, so as to facilitate the quick change of said humidifying element of bread that is inside said humidifying element chamber.

11. The moisture preservation baked goods container described in claim 1, said humidifying element chamber having a lower posterior surface and said humidifying element chamber further comprised of:
   a securement door; said securement door having an interior surface, and said securement door being of rectangular configuration, and attached to said lower posterior surface of said humidifying element chamber, and said securement door having a cross sectional area slightly less than said humidifying element chamber, such that when said securement door is closed, an air resistant seal is formed between said securement door and said humidifying element chamber; with said securement door used to hold said humidifying element inside of said humidifying element chamber.

12. The moisture preservation baked goods container described in claim 1, said humidifying element chamber further comprised of:
   a securement door retaining means; said securement door retaining means comprised of a spring mechanism, said securement door retaining means holding said securement door in the closed position when said securement door is released by the operator.

13. The moisture preservation baked goods container described in claim 1, wherein said humidifying element chamber further comprises evaporation holes, said evaporation holes being in rows and columns, with each said evaporation holes passing completely through said securement door, with a radial center that is perpendicular to the plane formed said securement door, said evaporation hole being of sufficient size so as to facilitate the passing of moisture from said humidifying element chamber to said lid and said container.

14. The moisture preservation baked goods container described in claim 1, wherein said humidifying element chamber further comprises evaporation protrusions; said evaporation protrusions connected to and extending outward from said interior surface of said securement door, perpendicular to said interior surface of said securement door, with said evaporation protrusion being aligned in rows and columns, said evaporation holes being of sufficient length to ensure that said humidifying element of bread does not rest against said interior surface of said securement door.

15. The moisture preservation baked goods container described in claim 13, wherein said evaporation holes are arranged in any configuration such that sufficient evaporation holes are present to facilitate the moisture transfer between said humidifying element chamber and said lid and said container.

16. The moisture preservation baked goods container described in claim 14, wherein said evaporation protrusions are arranged in any configuration such that sufficient evaporation protrusions are present to prevent said humidifying element of bread from resting against said interior surface of said securement door.

17. The moisture preservation baked goods container described in claim 1, whereby a humidifying element of bread is placed is said humidifying element chamber, such that the moisture present is said humidifying element of bread is used to increase the humidity inside of said lid and said container of said moisture preservation baked goods container, so as to keep baked goods moist and edible, said moisture transfer being facilitated by having said humidifying element of bread placed on said evaporation protrusion so that the moisture from said humidifying element can pass through said evaporation holes into said lid and said container.

* * * * *